United States Patent [19]

Meyer et al.

[11] Patent Number: 5,247,350
[45] Date of Patent: Sep. 21, 1993

[54] METHOD AND APPARATUS FOR TESTING VIDEO

[76] Inventors: Corwyn R. Meyer, 3820 Ronning Dr., Sioux Falls, S. Dak. 57103; Scott A. Schlag, 5201 Drexel Dr., Sioux Falls, S. Dak. 57106

[21] Appl. No.: 818,332

[22] Filed: Jan. 9, 1992

[51] Int. Cl.[5] .................. H04N 17/02; H04N 17/04
[52] U.S. Cl. .................................. 358/10; 358/139; 358/324; 358/327
[58] Field of Search .............. 358/10, 139, 335, 336, 358/318, 320, 323, 324, 327; 360/27, 28; 369/53

[56] References Cited

U.S. PATENT DOCUMENTS

| | | | |
|---|---|---|---|
| 4,554,663 | 11/1985 | Pham van Cang | 358/10 |
| 4,907,181 | 3/1990 | Hedtke et al. | 358/10 |
| 4,931,877 | 6/1990 | Gebhardt et al. | 358/139 |

FOREIGN PATENT DOCUMENTS 0023375  2/1982  Japan ......................... 358/10

Primary Examiner—James J. Groody
Assistant Examiner—Michael H. Lee
Attorney, Agent, or Firm—Patnaude, Videbeck & Marsh

[57] ABSTRACT

The chroma circuits of a VCR are tested by replacing the video signal from the video heads of the VCR with a composite signal from a test pattern signal developed by a test instrument, which composite signal includes a chroma signal which is phase rotated in response to a chroma reference signal from the VCR. The chroma reference signal from the VCR is used to control the chroma signal in the composite test pattern signal.

8 Claims, 1 Drawing Sheet

METHOD AND APPARATUS FOR TESTING VIDEO

The present invention relates in general to methods and apparatus for testing and servicing video cassette recorders, hereinafter referred to as VCRs, and it relates in particular to a new and improved method and instrument for servicing the chroma conversion circuit of a VCR.

BACKGROUND OF THE INVENTION

Video cassette recorders reproduce the video signal on a magnetic tape by demodulating an FM luminance signal to produce the luminance or black and white portion of the composite video signal. The VCR also converts the down converted phase rotated chroma signal on the tape to a chroma information signal at a carrier frequency of 3.58 MHz. The thusly converted luminance and chroma signals are subsequently combined and applied to the video signal input terminals of a television receiver for observation of a video pattern on the screen of the television receiver.

The chroma conversion circuits in a present day VCR employ an internally developed 30 Hz chroma reference signal which ensures that the direction of phase rotation is executed correctly to produce an accurate representation of the information recorded on the tape. The phase rotation may differ depending on the type of format used in the VCR under test. For example, in the VHS format the chroma carrier is shifted in a positive direction 90 degrees for every horizontal line. This phase shift or rotation progresses in the following order for one-half of the 30 Hz pulse: 0, 90, 180, 270, 0. For the other half of the 30 Hz pulse the phase rotation is 0, 270, 180, 90, 0. Its purpose is to minimize crosstalk between different tracks on the tape.

Moreover, the luminance FM demodulator changes the frequency and deviation of the FM carrier in accordance with the particular protocol of the system used by the VCR.

One known method of troubleshooting the chroma circuits of a VCR is to use an oscilloscope to detect defects in the chroma circuits. This signal tracing method works well in some applications, but in some cases the signals being analyzed in the chroma conversion circuits are very complex and difficult to comprehend when viewed on an oscilloscope. One signal which is particularly difficult to scrutinize on an oscilloscope is the phase-rotated down converted chroma carrier which is constantly being phase rotated at the video horizontal rate.

In another method of troubleshooting the chroma conversion circuits in a video conversion circuit, an FM luminance signal and a down converted, phase rotated chroma signal are injected into the VCR circuits ahead of the FM demodulator and the chroma convertor circuits, and a television receiver is used to monitor the picture corresponding to the injected FM luminance and phase rotated chroma signals. It is known to inject other signals into the VCR circuits to detect defective circuitry therein. Such injected signals have included a 3.58 MHz reference pulse, a horizontal key pulse, and a 30 Hz reference pulse signal. All of these signals have been synchronized to the injected FM luminance and down converted, phase rotated chroma signals.

It is also known to overdrive the 30 Hz reference signal in a VCR with a separately generated 30 Hz reference signal which is in sync with the injected signals. A problem with this method is the fact that the overdriving signal is very level and phase sensitive. Also, there is potential damage to the low impedance 30 Hz drive circuits in the VCR. For example, the 30 Hz reference signal in the VCR might be running at a slightly different frequency from the 30 Hz reference injected signal. The injected chroma signal will then fall out of phase with the internally generated 30 Hz reference signal causing the chroma conversion circuits to be rotating in one direction while the injected phase rotated chroma signal is rotating in the opposite direction. When the picture is viewed on the screen of the associated television receiver, such a condition produces undesirable results in the form of bursts of color which occur when the two 30 Hz reference signals temporarily fall into phase. As a result of this condition, the service technician may be led to believe that the color conversion circuit is defective even though it might be operating properly.

SUMMARY OF THE INVENTION

Briefly, there is provided in accordance with the teachings of the present invention a new and improved method and apparatus for use in troubleshooting the chroma circuits of a VCR by utilizing the internally generated 30 Hz reference signal already present in the VCR. Using this method and apparatus the problems associated with the use of two unlocked 30 Hz reference signals are avoided, and any potential damage to the VCR is also avoided since the 30 Hz internal reference signal need not be overdriven.

GENERAL DESCRIPTION OF THE DRAWING

A better understanding of the present invention will be had from a reading of the following detailed description taken in connection with the accompanying drawing wherein:

The single figure is a schematic circuit diagram of a test circuit embodying the present invention in use in the testing of the chroma conversion circuits of a VCR.

DETAILED DESCRIPTION OF A PREFERRED EMBODIMENT

Figure 1:
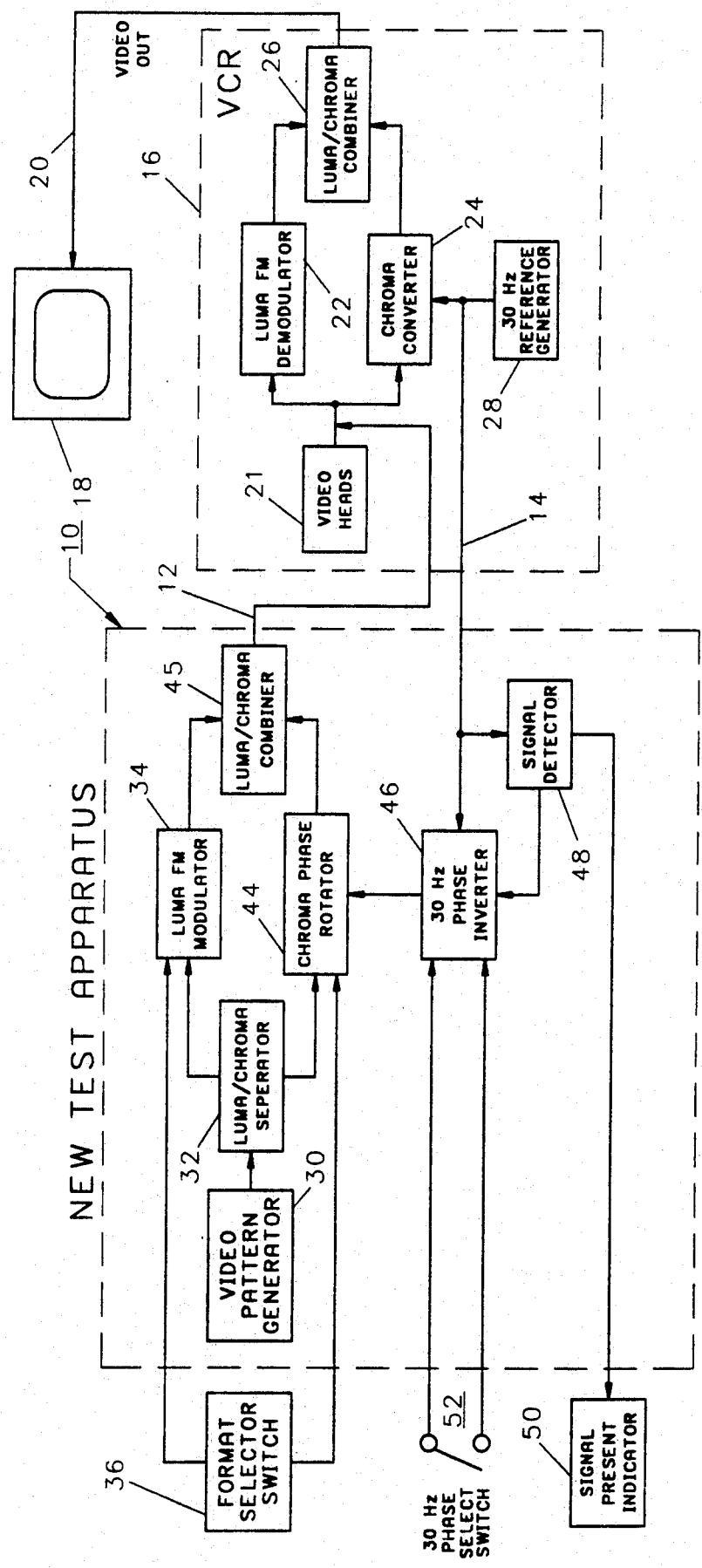

Referring to the drawing, a test instrument 10 embodying the present invention is connected by a pair of conductive cables 12 and 14 to a VCR 16 having its output connected to the video input terminals of a television receiver 18 via a conductive cable 20. The VCR 16 is conventional and may be seen to include video heads 21 which produce a video output signal corresponding to that recorded on the magnetic tape of an associated cassette.

Only those circuits of the VCR to which the present invention pertains are shown in the drawing, and they may be seen to include a luminance or luma FM demodulator 22 and a chroma convertor 24 to which a video signal from the output of the video heads 21 of the VCR 16 is normally supplied. The respective output signals from the luma FM demodulator 22 and the chroma convertor 24 are applied to a Luma/Chroma Combiner 26 wherein the two signals are combined into a single composite signal and connected by the cable 20 to the video input terminals of the television receiver 18. In some cases the VCR will have an RF modulator to which the composite luminance and chroma signal can be applied to produce a modulated RF signal which can then be applied to the antenna input terminals of the television receiver.

Since the amplitude modulated chroma signal is down converted from the normal carrier frequency of 3.58 MHz to say 629 KHz in the VHS format at the time of recording, it must be up converted back to the 3.58 MHz frequency before being connected to the television receiver, and this step of up-converting is done in the chroma convertor 24. In addition, the chroma signal must be phase rotated according to the protocol of the particular format of the VCR 16. To this end, a 30 Hz reference generator 28 generates a reference signal in the form of a train of pulses which occur at the rate of 30 Hz, and which are connected to the chroma convertor circuits 24 where the phase of the reference signal controls the direction of phase rotation of the chroma signal. In the VHS format, for example, the chroma signal is phase rotated 90 degrees in one direction for each successive horizontal line of the TV signal during one field, and it is phase rotated 90 degrees in the opposite direction for each successive horizontal line of the TV signal during the next field. In other formats, such as Beta or eight millimeter, the sequence and angles of the phase shifts are different.

In order to test the luminance or luma and the chroma circuits of the VCR 16 in accordance with the teachings of the present invention, the test instrument 10 is connected to the VCR 16 by the cables 12 and 14 as shown and described above. The luminance and chroma test signals are fed to the VCR 16 by the cable 12 and the 30 Hz reference signal from the VCR 16 is fed to the instrument 10 by the cable 14. The test instrument 10 develops a composite luminance and chroma signal which is used to replace the output signal from the video heads 21 of the VCR 16 which is acted on by the luminance and chroma circuits of the VCR 16 and applied to the television receiver 18 where the test pattern from the test instrument 10 can be observed.

The test instrument 10 includes a video pattern generator 30 which produces a picture signal which is applied to a luma/chroma separator 32 which separates the luminance and chroma portions of the video signal applied thereto. The luminance portion of the composite video signal from the test pattern generator is applied to a luma FM modulator 34 wherein the luminance signal is modulated onto an RF carrier at the appropriate frequency for the VCR 16 under test. As shown, a format selector switch 36 connected to the luma FM modulator 34 and the chroma phase rotator 44 is provided to enable the technician to select the appropriate format.

The chroma signal from the luma/chroma separator 32 is applied to a chroma phase rotator 44 which down converts the chroma carrier frequency to that of the VCR 16 under test and phase shifts or rotates the chroma signal in accordance with the protocol of the format of the VCR 16.

The output signals from the luma FM modulator 34 and the chroma phase rotator 44 are applied to a luma/chroma combiner 45, and the combined signal from the luma/chroma combiner 45 is connected through the cable 12 to the inputs of the luma FM demodulator 22 and the chroma convertor 24 in the VCR 16. The output impedance of the luma/chroma combiner 45 is sufficiently low so that the composite signal from the cable 12 swamps out any signal that may be present at the output terminals of the video heads 21 in the VCR 16.

In order to control the direction of the phase rotation in the chroma phase rotator 44, the 30 Hz signal from the VCR 16 is connected through the cable 14 and a manually controlled 30 Hz phase inverter 46 to the reference signal input of the chroma phase rotator 44. The cable 14 is also connected to a signal detector 48 which drives a signal present indicator 50 to provide a visual indication to the technician when the reference signal is present. The signal detector 48 also enables the 30 Hz phase inverter 46 only when a 30 Hz reference signal from the VCR 16 is present. A 30 Hz phase select switch 52 is used by the operator to reverse the phase of the 30 Hz reference signal thereby to reverse the phase rotation of the chroma signal in the event that the test pattern appearing on the screen of the television receiver 18 has no color. If the VCR 16 is functioning properly, the color will be present when the 30 Hz phase select switch 52 is in one position or the other. When the 30 Hz phase select switch 52 is open the signal reference from the VCR 16 is applied directly to the chroma phase rotator 44, but when the 30 Hz phase select switch 52 is closed, the reference is phase shifted through one-hundred eighty degrees.

In operation, the cables 12 and 14 from the test instrument 10 are connected to the appropriate points in the VCR 16 under test, and the VCR 16, the television receiver 18 and the test instrument 10 are energized. The signal present indicator 50, which may not be built into the test instrument 10, is observed to make sure that the cables 12 and 14 have been connected to the right points in the VCR 16. If the cables 12 and 14 are properly connected, the test pattern generated by the video pattern generator 30 will appear on the screen of the television receiver 18. If the color definition in the pattern is good and appears to be locked so that the color is not changing, then the chroma circuits of the VCR 16 are known to be functioning properly. On the other hand, if no color is present or if it appears to be unlocked, the technician should toggle the 30 Hz phase select switch 52 to the other switching position thereby to reverse the polarity of the 30 Hz chroma reference signal applied to the chroma phase rotator 44 by the 30 Hz phase inverter 46. If the luminance and chroma circuits in the VCR 16 are functioning properly, the test pattern will appear on the screen of the television receiver 18 in full color with the color locked and not changing. If there is no color or if the color is changing, the technician will know that there is a problem with the chroma circuits of the VCR 16 and that they require troubleshooting.

While the present invention has been described in connection with a particular embodiment thereof, it will be understood that those skilled in the art may make many changes and modifications which fall within the true scope and spirit of the invention. Therefore, it is intended by the appended claims to cover all such changes and modifications which fall within the true spirit and scope of the invention.

What is claimed:

1. A method of testing the chroma circuits of a VCR having an output wherein said VCR has an internal source of a chroma reference signal, a luminance demodulator circuit, and a chroma converter circuit, said method comprising the steps of connecting the output of said VCR to a video input of a television receiver, providing a test pattern generator having an output for producing a composite video signal including a luminance signal and a chroma signal, coupling said output of said test pattern generator to a luminance demodulator and to a chroma phase rotator means for rotating the phase of the chroma signal in the test pattern through a predetermined sequence of phase shifts, said luminance demodulator and said chroma phase rotator means each having outputs, combining said outputs of said demodulator and said chroma phase rotator means to provide a second composite signal, connecting said second composite signal to a location in said VCR ahead of said luminance demodulator and chroma convertor circuits of said VCR, applying a chroma reference signal from said VCR to said chroma phase rotator to control the direction of rotation of said chroma signal, and observing said video pattern on the screen of said television receiver.

2. The method according to claim 1, comprising the further step of reversing the phase of said chroma reference signal applied to said chroma phase rotator means if said video pattern which appears on said television receiver screen does not contain any color.

3. The method according to claim 1, comprising the further steps of providing a signal present indicator, and connecting said chroma reference signal to said signal present indicator to provide an indication as to whether said chroma reference signal is present.

4. In an instrument for testing the chroma conversion circuits in a VCR, comprising in combination a video pattern generator having a composite video signal including a luminance signal and a chroma signal, separator circuit means for separating said chroma and luminance signals from one another, means for shifting the phase of said chroma signal in response to the phase of a chroma reference signal applied thereto, phase reversal means for phase reversing a chroma reference applied thereto through 180 degrees, and means for selectively applying to said means for shifting the phase of said chroma signal to said chroma reference signal from said VCR or a phase reversed signal from said phase reversing means.

5. The combination according to claim 4, comprising signal detector means for providing a sensible indication of the presence of said chroma reference signal connected from said VCR to said phase shift means.

6. The combination according to claim 5, comprising means responsive to an output of said signal detector means for enabling said phase shift means only when a chroma reference signal is connected from said VCR to said phase shift means.

7. A test instrument for testing chroma circuits of a VCR having an output and having an internally generated chroma reference signal, comprising in combination video pattern generator means for generating a colored video test pattern signal, means for demodulating the luminance portion of said video test pattern signal, means for phase rotating the chroma portion of said test pattern signal through a plurality of predetermined angular positions, means responsive to the phase of a signal for controlling the direction of rotation of said chroma portion of said reference signal in response to the phase of a chroma reference signal, combining a demodulated luminance signal and a phase rotated chroma signal to provide a composite signal and applying said composite signal to said VCR for observation of said video pattern on a television receiver to which said output of said VCR is connected, and connecting said internally generated chroma reference signal to said means for phase rotating a signal.

8. The instrument according to claim 7, comprising manually controlled means in said instrument for reversing the phase of said chroma reference signal before the application thereof to said means for phase rotating said chroma signal.

* * * * *